United States Patent Office 3,478,068
Patented Nov. 11, 1969

3,478,068
4α,10α;2β,1' - BICYCLO - 5β - METHYL - 19 - NOR-
STEROIDS AND THEIR PREPARATION
Oskar Jeger, Zollikerberg, Zurich, Kurt Schaffner, Zurich, and Hans Ueli Wehrli, Schaffhausen, Switzerland, assignors to Ciba Corporation, New York, N.Y., a corporation of Delaware
No Drawing. Filed Jan. 23, 1967, Ser. No. 610,741
Claims priority, application Switzerland, Feb. 4, 1966, 1,605/66
Int. Cl. C07c 169/34, 169/10; A61k 27/00
U.S. Cl. 260—397.4                                      7 Claims

ABSTRACT OF THE DISCLOSURE

New 19-nor-steroids of the partial formula

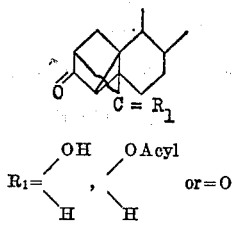

for example: 3-oxo-1'-hydroxy-17β-acetoxy-1',2β;4α,10α-bicyclo-19-nor-5β-methyl-(1')-androstane, its 1'-acetate or the 1'-oxo-analogue.

Use: For treating circulatory diseases and hypotension and the process of preparing same by heating a 3-oxo-5β-formyl-4α,10α-cyclo-19-nor-steroid or by treating it with an acidic or preferably basic agent.

BACKGROUND OF THE INVENTION

The invention concerns new 19-nor-steroids and their preparation, which have not been heretofore disclosed in the literature.

The present invention relates to the manufacture of new 19-norsteroids, especially of 3-oxo-4α,10α;2β,1'-bicyclo-5β-methyl-(1')-19-norsteroids of the partial formula

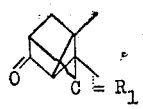

in which $R_1$ represents a free or esterified hydroxyl group together with a hydrogen atom, or an oxo group.

The above-mentioned compounds form a new type of biologically active steroid analogues, or they are valuable intermediates for the manufacture of biologically active compounds. Above all, they act as coronary dilators and have also analeptic, diuretic and sodiuretic effects. They have an antiandrogenic and only a weak sex-hormone effect. They may be used, for example, for treating circulatory diseases and hypotension.

Of special value are compounds of the formulae

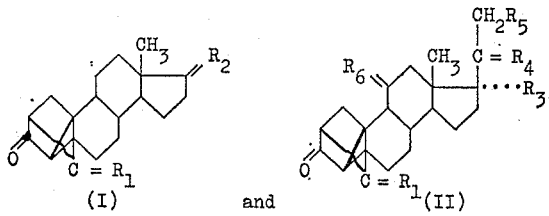

in which $R_1$ has the above meanings and represents above all a free oxo group, a free hydroxyl group, or a hydroxyl group esterified with a lower aliphatic carboxylic acid, together with a hydrogen atom, $R_2$ represents an oxo group or a free or esterified β-positioned hydroxyl group and a hydrogen atom or a lower aliphatic hydrocarbon residue, $R_3$ represents a hydrogen atom, or a free or esterified hydroxyl group, $R_4$ an oxo group, $R_5$ a hydrogen atom or a free or esterified hydroxyl group and $R_6$ represents two hydrogen atoms, or a free or esterified hydroxyl group together with a hydrogen atom, $R_3+R_4+R_5$ may also represent a bis-alkylenedioxy, preferably a bis-methylenedioxy grouping.

Particularly advantageous biological properties are found in those compounds of the Formula I in which $R_1$ represents a free hydroxyl group, or a lower alkanoyloxy group together with a hydrogen atom, or a free oxo group, and $R_2$ represents a keto group or a free hydroxyl group or a hydroxyl group esterified with a lower aliphatic caboxylic acid together with a hydrogen atom or a lower alkyl, such as methyl or ethyl, radical, a lower alkenyl such as vinyl, allyl or methay radical or a lower alkinyl such as ethinyl or propinyl radical. The following compounds deserve special mention: 3,17,1'-trioxo-4α,10α;2β,1'-bicyclo-5β-methyl-(1')-19-nor-androstane, 3,1'-dioxo-17β-hydroxy-4α,10α;2β,1'-bicyclo-5β-methyl-(1')-19-nor-androstane and its esters, 3,1'-dioxo-17β-hydroxy-17α-methyl-, -17α-vinyl-, -17α-ethinyl-4α,10α;2β,1'-bicyclo-5β-methyl-(1')-19-nor-androstane and its esters; also 3-oxo-1',17β-dihydroxy-17α-methyl-, -17α-vinyl-, -17α-allyl- and -17α - ethinyl - 4α,10α;2β,1' - bicyclo - 5β - methyl - (1')-19-nor-androstane and its esters. Of special value are also the following compounds of the Formula II: 3,20,1'-trioxo-4α,10α;2β,1'-bicyclo-19-nor-pregnane, 3,20-dioxo-1',11β,17α,21-tetrahydroxy-4α,10α;2β,1'-bicyclo-19-nor-pregnane and their esters.

The acid residues in the above-mentioned esters are especially those of aliphatic, cycloaliphatic, araliphatic, aromatic or heterocyclic carboxylic acids containing 1 to 15 carbon atoms, for example formates, acetates, propionates, butyrates, trimethylacetates, caproates, valerates, decanoates, undecylenates, cyclopentylpropionates, tetrahydrobenzoates, phenylpropionates, benzoates, furoates, trifluoroacetates, ethyl and methyl carbonates.

A possibly obtained bicyclo-5β-methyl-19-norsteroid, which contains in position 17 the side chain of the cholane, cholestane, spirostane or cardanolide series, may, if desired, be converted in known manner into the pharmacologically highly potent androstane or pregnane derivatives, for example by acylolysis, oxidation and/or microbiological means.

The new pharmacologically active compounds may be used as medicaments in human or veterinary medicine, for example in the form of pharmaceutical preparations containing the new compounds in conjunction or admixture with an organic or inorganic, solid or liquid pharmaceutical excipient suitable for enteral (for example oral), parenteral or local administration. Suitable excipients are substances that do not react with the new compounds, for example water, gelatin, lactose, starches, magnesium stearate, talcum, vegetable oils, benzyl alcohols, gums, polyalkylene glycols, white petroleum jelly, cholesterol or other known medicinal excipients. The pharmaceutical preparations may be in the solid form, for example tablets, dragees or capsules, or in liquid or semi-liquid form solutions, suspensions, emulsions, ointments or creams. These pharmaceutical preparations may be sterilized and/or contain auxiliaries such as preserving, stabilizing, wetting or emulsifying agents, salts for regulating the osmotic pressure or buffers. They may also contain other therapeutically valuable substances. They are formulated in the known manner.

The new compounds are obtained when 3-oxo-5β-formyl-4α,10α-cyclo-19-norsteroids are treated with acidic or preferably with basic agents or heated and in a resulting 3 - oxo - 1' - hydroxy-4α,10α;2β-1'-bicyclo-5β-methyl-(1'-19-nor-steroid, if desired, acetal groups present are liberated, ether or ester groups present are converted into free hydroxyl groups and/or hydroxy groups present are esterified, etherified or oxidized.

The present process may be represented, for example, by the following scheme of partial formulae:

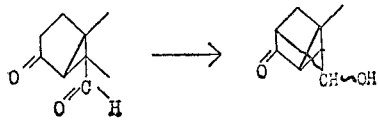

The 3-oxo-5-formyl-4α,10α-cyclo-19-norsteroids used as starting materials are new and are accessible, for example by the process of our application No. 610,743, filed Jan. 23, 1967, by irradiating a 3,19-dioxo-Δ⁴-steroid and isolating the desired product from the reaction mixture, for example by chromatography.

The condensation according to this invention proceeds extremely readily, for example in the presence of even a small amount of an acid or base, inter alia by heating in glacial acetic acid or pyridine, or even by a mere treatment with alumina in benzene. It may also be achieved purely thermally, for example by sublimation in a high vacuum.

Any ester or protective groups, for example ketals, present in the resulting products may be split hydrolytically and free hydroxyl groups oxidized to oxo groups. On the other hand, a process product containing a free hydroxyl group may be converted in known manner into an ester or ether thereof, for example by acylation with the anhydride or a halide of a carboxylic acid.

The 3-oxo-5-formyl-4α,10α-cyclo-19-norsteroids used as starting materials in the process of this invention belong preferably to the androstane, pregnane, cholane, cholestane, furostane, spirostane or cardanolide series and may contain in addition to the afore-mentioned groups further substituents, such as alkyl, for example methyl groups, halogen atoms, functionally modified oxo groups and/or free or esterified hydroxyl groups. They may also contain further double bonds, especially in the 6,7,-position. Particularly important starting materials are, for example, 3-oxo-5β-formyl - 17β - hydroxy - 4α,10α-cyclo-19-norandrostane and its esters, 3,20-dioxo-5β-formyl-4α,10α-cyclo-19-norpregnane and its 20,20-ethylenedioxy derivative, and 3-oxo-5β-formyl-11α - hydroxy-17α,20,20,21-bismethylenedioxy-4α,10α-cyclo-19-norpregnane and its esters.

The following examples illustrate the invention.

EXAMPLE 1

50 milligrams of 3-oxo-5β-formyl-17β-acetoxy-4α,10α-cyclo-19-norandrostane in 50 ml. of benzene are mixed with 1.5 g. of neutral alumina (activity III) and stirred for 12 hours. The alumina is then filtered off, rinsed with much ethyl acetate and evaporated. The crude product is twice recrystallized from acetone+petroleum ether, to yield 40 mg. of 3-oxo-1'-hydroxy-17β-acetoxy-1',2β;4α,-10α-bicyclo-19-nor-5β-methyl-(1')-androstane melting at 209° C. Optical rotation [α]_D=+84° (c.=0.34). Infrared bands at 3600, 1750–1700, 1250 cm.⁻¹.

Cyclization is also possible by boiling in pyridine or acetic acid, or purely thermally by sublimation in a high vacuum.

The starting material used in this example can be prepared thus:

A solution of 11.8 g. of 3,17-dioxo-19-hydroxy-Δ⁴-androstene in 150 ml. of tetrahydrofuran is stirred at 20° C. into a solution of 11.8 g. of lithium-aluminium tri-tertiary butoxyhydride in 100 ml. of tetrahydrofuran. The mixture is stirred for 45 minutes at 20° C., mixed with aqueous glacial acetic acid of 5% strength, diluted with ethyl acetate and worked up in the usual manner. The resulting crude product is acetylated in 250 ml. of a 1:1-mixture of acetic anhydride and pyridine overnight at room temperature. The batch is evaporated under vacuum and the resulting crude product dissolved in methylenechloride and filtered through neutral alumina (activity III); the evaporated eluates are than recrystallized from acetone+petroleum ether, to yield 7.2 g. of 3-oxo-17β,19-diacetoxy-Δ⁴-androstene melting at 97 to 100° C. Optical rotation [α]_D=+133° (c.=0.51). Infrared bands at 1725, 1675, 1623 and 1255 cm.⁻¹.

2 grams of the above diacetate are hydrolyzed in 450 ml. of aqueous methanol of 90% strength with 1.2 mol equivalents of sodium bicarbonate for one hour at the boil. Water is added until crystallization sets in, after cooling the crystals formed are suctioned off, washed with much water, dried and recrystallized from acetone+petroleum ether, to yield 1.6 g. of 3-oxo-17β-acetoxy-19-hydroxy-Δ⁴-androstene melting at 162 to 163° C. Optical rotation [α]_D=+76° (c.=0.90). Infrared bands at 3600, 1725, 1675, 1623 and 1255 cm.⁻¹.

5 grams of the compound obtained in this manner in 75 ml. of dimethylformamide are mixed with 6.1 ml. of 8 N-chromic acid in 8 N-aqueous sulphuric acid and heated for 4½ hours at 40° C. An aqueous solution of 1% of sodium sulphate is added until crystallization sets in. The product is filtered off, the crystals are washed with water and dried. On recrystallization from acetone+petroleum ether there are obtained 4.0 g. of 3,19-dioxo-17β-acetoxy-Δ⁴-androstene melting at 131 to 132° C. Optical rotation [α]_D=+143° (c.=0.68). Infrared bands at 2800, 1725, 1675, 1622 and 1255 cm.⁻¹.

3 grams of 3,19-dioxo-17-acetoxy-Δ⁴-androstene are dissolved in 150 ml. of ethanol and irradiated with a mercury vapour low-pressure burner in a quartz vessel at room temperature under nitrogen for 5 hours. The reaction mixture is then evaporated under vacuum, the residue dissolved in ether and the ethereal solution is washed with N-aqueous sodium hydroxide solution. The ethereal solution is evaporated and the residue chromatographed in a 4:1-solution of benzene+ethyl acetate on silica gel. There are at first obtained 580 mg. of 19-nortestosterone acetate which after one crystallization from acetone+petroleum ether melts at 124° C. Mixed melting point, infrared spectrum and thin-layer chromatogram are identical with those of a 19-nortestosterone acetate obtained by a different route. (According to the thin-layer chromatogram of the primary reaction solution, however, the primarily formed product is 3-oxo-17β-acetoxy-Δ⁵⁽¹⁰⁾-oestrene which is isomerized during the working up.)

Subsequent 4:1 benzene+ethyl acetate fractions consist of 620 mg. of unreacted starting material. Finally, 725 mg. of 3-oxo-5β-formyl-17β-acetoxy-4α,10α-cyclo-19-norandrostane are eluted; after two recrystallizations from acetone+petroleum ether it melts at 135° C. Optical rotation [α]_D=+60° (c.=0.32). Infrared bands at 2720, 1725 and 1250 cm.⁻¹.

EXAMPLE 2

90 milligrams of the 3-oxo-1'-hydroxy-17β-acetoxy-1',-2β;4α,10α-bicyclo-19-nor-5β-methyl-(1') - androstane obtained in Example 1 are acetylated overnight at room temperature in 5 ml. of a 1:1-mixture of acetic anhydride and pyridine, then evaporated under vacuum, the residue is taken up in benzene and filtered through neutral alumina (activity III), to yield 71 mg. of 3-oxo-1',17β-diacetoxy-1',2β;4α,10α-bicyclo - 19 - nor-5β-methyl-(1')-androstane which melts at 148° C. after two recrystallizations from acetone+petroleum ether. Infrared bands at 1750–1700 and 1250 cm.⁻¹.

EXAMPLE 3

A solution of 20 mg. of 3-oxo-1'-hydroxy-17β-acetoxy-1',2β; 4α,10α - bicyclo-19-nor-5β-methyl-(1')-androstane in 5 ml. of acetone is mixed with an excess of 8 N-chromium trioxide in 8 N-sulphuric acid. After 15 minutes, methanol is added and the whole is worked up in the usual manner, to yield 18 mg. of 3,1'-dioxo-17β-acetoxy-1',2β;

4α,10α-bicyclo-19-nor-5β-methyl-(1')-androstane which, after recrystallization from acetone+petroleum ether, melts at 237° C. Infrared bands at 1775, 1725 (broad) and 1250 cm.$^{-1}$.

What is claimed is:

1. Process for the manufacture of 3-oxo-4α,10α;2β,1'-bicyclo-5β-methyl-(1')-19-norsteroids selected from the group consisting of those of the androstane and pregnane series of the partial formula

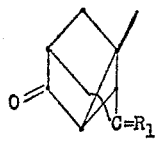

in which $R_1$ represents a free or esterified hydroxy group together with a hydrogen atom or an oxo group, wherein a 3-oxo-5β-formyl-4α,10α-cyclo-19-norsteroid is treated with a member selected from the group consisting of heat, an acidic and a basic agent.

2. Process as claimed in claim 1, wherein 3-oxo-5-formyl-4α,10α-cyclo-19-norsteroids of the formula

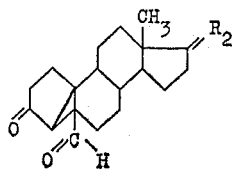

are used as starting materials, wherein $R_2$ represents a member selected from the group consisting of an oxo group and a free and an esterified β-positioned hydroxyl group together with a hydrogen atom and a lower aliphatic hydrocarbon residue.

3. Process as claimed in claim 1, wherein 3-oxo-5-formyl-4α,10α-cyclo-19-norsteroids of the formula

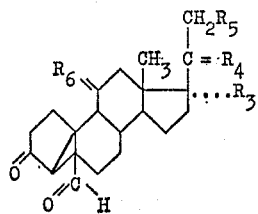

are used as starting materials, wherein $R_3$ represents a member selected from the group consisting of a hydrogen atom and a free and an esterified hydroxy group, $R_4$ is a member selected from the group consisting of a free and a ketalized oxo group, $R_5$ stands for a member selected from the group consisting of a hydrogen atom and a free and an esterified hydroxyl group and $R_6$ represents a member selected from the group consisting of two hydrogen atoms and a free and an esterified hydroxyl group together with a hydrogen atom, and $R_3$, $R_4$ and $R_5$ together stand for a bis-alkylenedioxy group.

4. Process as claimed in claim 1, wherein 3-oxo-5β-formyl-17β-acetoxy-4α,10α-cyclo-19-norandrostane is used as starting material.

5. 3-oxo-4α,10α;1',2β-bicyclo-5β-methyl-(1')-19-norsteroids, having the formula

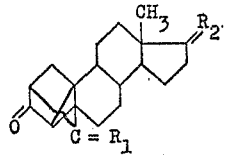

in which $R_1$ is a member selected from the group consisting of a free and an esterified hydroxyl group together with a hydrogen atom and an oxo group, $R_2$ represents a member selected from the group consisting of an oxo group and a free and an esterified β-positioned hydroxyl group together with a hydrogen atom and a lower aliphatic hydrocarbon residue.

6. 3-oxo-4α,10α;1',2β-bicyclo-5β-methyl-(1)-19-norsteroids, having the formula

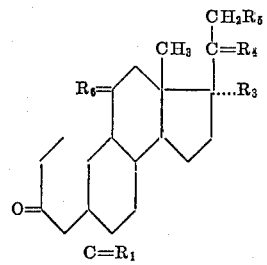

in which $R_1$ is a member selected from the group consisting of a free and an esterified hydroxyl group together with a hydrogen atom and an oxo group, $R_3$ represents a member selected from the group consisting of a hydrogen atom and a free and an esterified hydroxyl group, $R_4$ stands for an oxo group $R_5$ is a member selected from the group consisting of a hydrogen atom and a free and an esterified hydroxyl group, and $R_6$ represents a member selected from the group consisting of two hydrogen atoms and a free and an esterified hydroxyl group together with a hydrogen atom, or $R_3$, $R_4$ and $R_5$ together are a bis-alkylenedioxy group.

7. A compound of the formula shown in claim 5, wherein $R_1$ stands for a member selected from the group consisting of (1) hydroxy together with hydrogen, (2) acetoxy together with hydrogen and (3) oxo, and $R_2$ stands for acetoxy together with hydrogen.

No references cited.

ELBERT L. ROBERTS, Primary Examiner

U.S. Cl. X.R.

260—397.45, 239.55, 239.57, 397.2, 297.3, 397.47

CASE 5867/E

PO-1050
(5/69)

UNITED STATES PATENT OFFICE
CERTIFICATE OF CORRECTION

Patent No. 3,478,068      Dated November 11, 1969

Inventor(s) OSKAR JEGER ET AL

It is certified that error appears in the above-identified patent and that said Letters Patent are hereby corrected as shown below:

Column 5, line 17, delete "hydroxy" and substitute ---hydroxyl---.

Column 5, line 53, delete "hydroxy" and substitute ---hydroxyl---.

Column 6, line 23, delete "(1)" and substitute ---(1')---.

Column 6, lines 29 to 35, amend the left hand side of the formula to read:

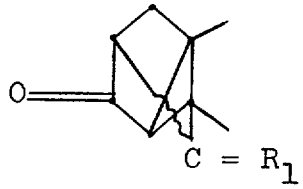

Column 6, line 41, after "group" insert ---,---.

SIGNED AND
SEALED

FEB 23 1971

(SEAL)
Attest:

Edward M. Fletcher, Jr.
Attesting Officer

WILLIAM E. SCHUYLER, JR.
Commissioner of Patents